INVENTORS
Thomas E. Bjorn
David S. Dopp

By (signature)
Attorney

March 10, 1970 T. E. BJORN ET AL 3,499,330
MECHANICAL BALANCERS
Filed Dec. 27, 1966 6 Sheets-Sheet 3
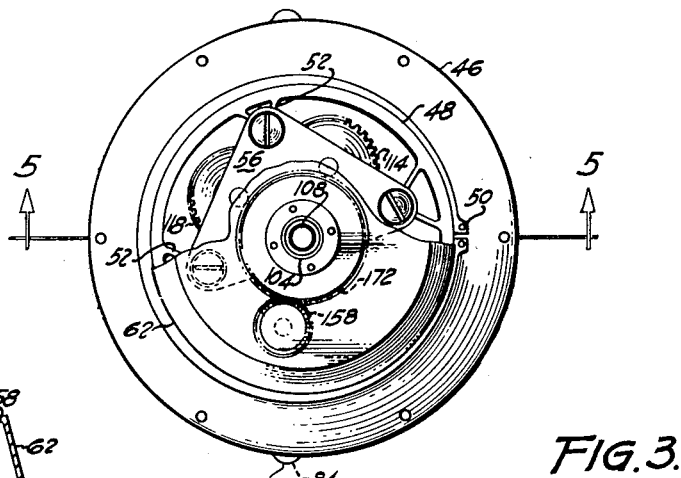
FIG. 3.
FIG. 6.
FIG. 5.
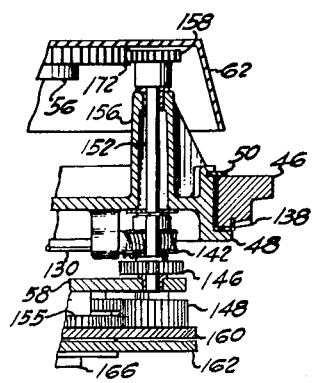
FIG. 4.
INVENTORS
Thomas E. Bjorn.
David S. Dopp.
By William J. Newman
Attorney

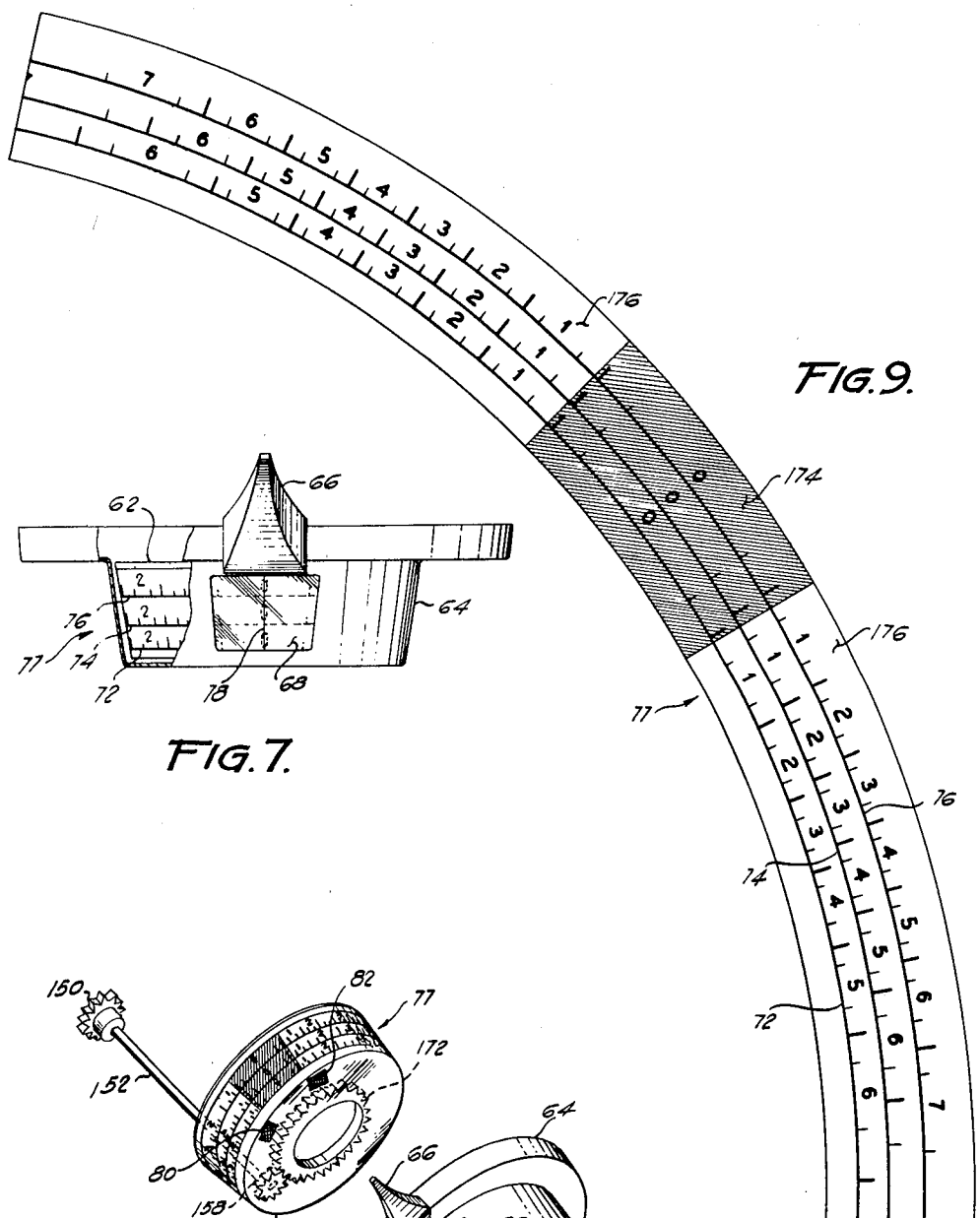

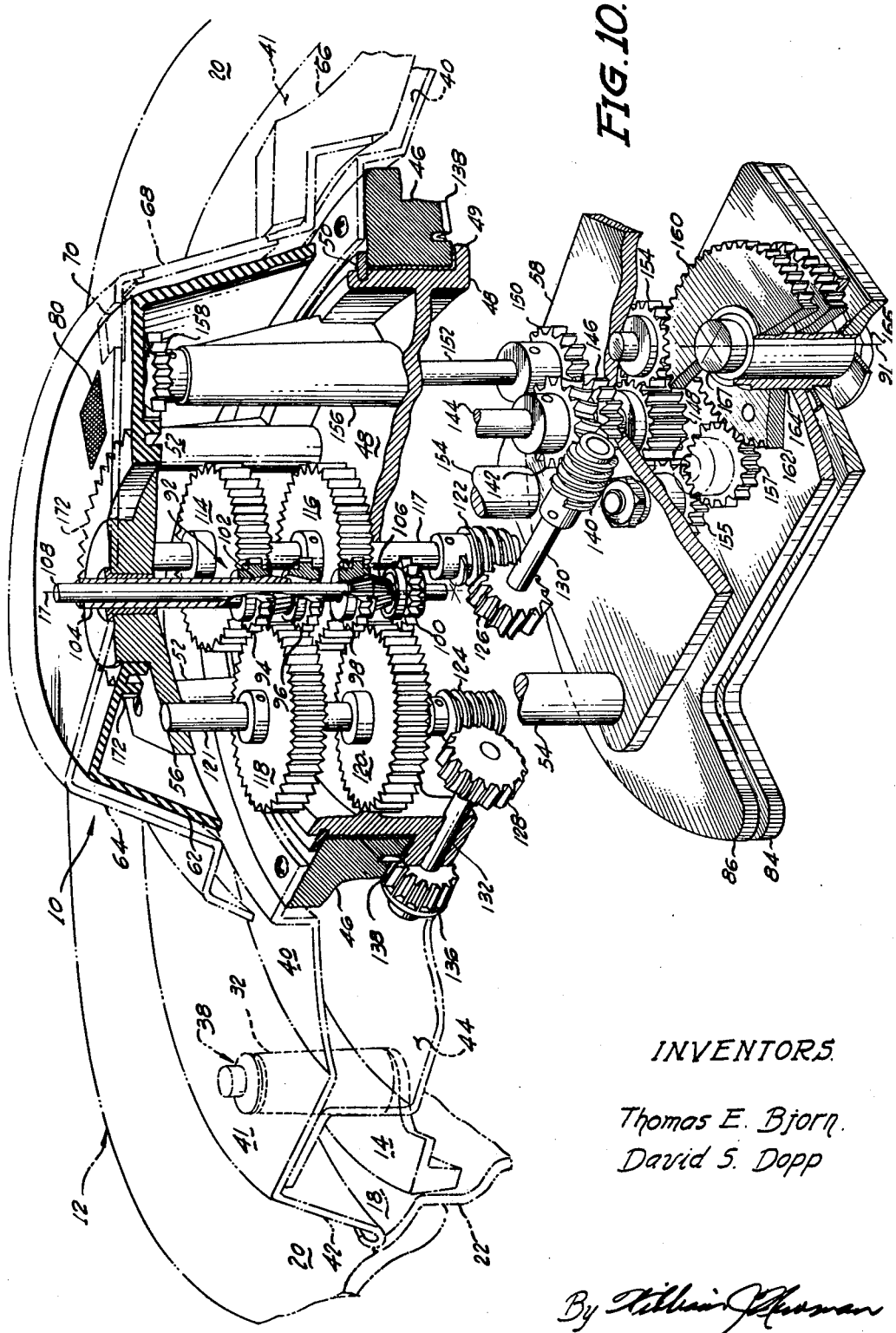
INVENTORS.
Thomas E. Bjorn.
David S. Dopp

March 10, 1970 T. E. BJORN ET AL 3,499,330
MECHANICAL BALANCERS
Filed Dec. 27, 1966 6 Sheets-Sheet 6

INVENTORS.
Thomas E. Bjorn
David S. Dopp

By
Attorney

United States Patent Office 3,499,330
Patented Mar. 10, 1970

3,499,330
MECHANICAL BALANCERS
Thomas E. Bjorn, Northbrook, and David S. Dopp, Chicago, Ill., assignors to Stewart-Warner Corporation, Chicago, Ill., a corporation of Virginia
Filed Dec. 27, 1966, Ser. No. 604,921
Int. Cl. G01m 1/00
U.S. Cl. 73—458                                10 Claims

ABSTRACT OF THE DISCLOSURE

This application describes mechanical balancers used for correcting unbalance in rotating bodies, particularly of the type which attach to a rotating body and have structure therein to compensate for the unbalance in the rotating object. The counterbalance mechanism is cyclically operable through the manipulation of knobs by an operator as the object is spinning and includes two weights, each of which is rotatable about an axis radially spaced from the axis of the object being balanced. The weights are rotated simultaneously in opposite directions so that the resultant of their vectorially added moments move along a diametric line passing through the axis of the object. The weights are constructed and arranged so that the counterbalance force of the device ranges from a completely balanced or zero condition to a maximum counterbalance force position, and so that it may be cyclically operated to approach the maximum and zero positions from either direction.

Background of the invention

The invention herein defined relates to the counterbalancing structure by which the amount of counterbalancing force provided by the device is varied. Although the embodiments shown herein relate specifically to devices for counterbalancing unbalance of vehicle wheels in situ, the teachings herein are not necessarily restricted thereto as they may be used in any balancing process in which an object to be balanced is caused to rotate about its axis of rotation and may conveniently have a balancing device attached thereto.

Prior art balancers provided for variable counterweight forces by the use of two or more weights mounted for rotation about the axis of the object being balanced, or by the use of a single weight operable along a line perpendicular to, and intersecting, the axis of rotation of the object. If the rotating weights were permitted to rotate through 360°, or if the linearly movable single weight was permitted to move from a point on one side of the object axis to the other, ambiguities in read out were present because of the existence of two positions for each value of resultant weight displaced from one another by 180 angular degrees.

To eliminate such ambiguities, some prior art devices have been constructed so that the rotating weights only move through 90 angular degrees from a position in alignment with each other on one side of the axis to a position wherein the weights are opposite each other on either side of the axis of rotation of the object. This type of balancer is shown in U.S. Patent No. 2,723,555, issued Nov. 15, 1955. A cyclic balancer which eliminates the ambiguities is shown in U.S. Patent No. 3,094,003, issued June 18, 1963, but is accomplished by utilizing a third fixed weight in the device against which the two rotatable weights about the object axis operate.

Summary

The teachings of this invention provide a balancer of the counterbalance force type which is fully cyclic through maximum and minimum positions with no read out ambiguities and with no fixed weights against which the rotatable weights must operate. This is accomplished by the provision of a pair of weights, each of which is mounted for rotation about an axis which is radially displaced from the axis of rotation of the object to which the device is attached. The weights are rotatable by operator manipulation in opposite directions simultaneously so that the resultant of the vectorially added moments of the two weights follow a path along a line perpendicular to and intersecting the axis of rotation of the object. A simplified, and thus less expensive, fully-cyclic ambiguityless balancer is thereby presented.

This invention, its objects and advantages will be better understood upon a further reading of this specification and claims together with the following drawings, wherein:

FIG. 3 is a sectional view of the balance assembly taken generally along the line 3—3 in FIG. 2, with the balancer housings omitted;

FIG. 4 is a sectional view of the balancer assembly taken generally along the line 4—4 in FIG. 2;

FIG. 5 is a sectional view taken along the line 5—5 in FIG. 3;

FIG. 6 is a fragmentary view in section of the indicating drum drive taken generally along the line 6—6 in FIG. 4;

FIG. 7 illustrates one relationship between the indicating drum scales and pointer housing;

FIG. 8 is an exploded perspective of the pointer housing and indicating drum;

FIG. 9 illustrates the scale strip prior to mounting on the indicator drum;

FIG. 10 is an isometric drawing of the balancer in partial section illustrating the coaction of the balancer gear trains with certain of the parts displaced somewhat for easier viewing;

Figure 1:
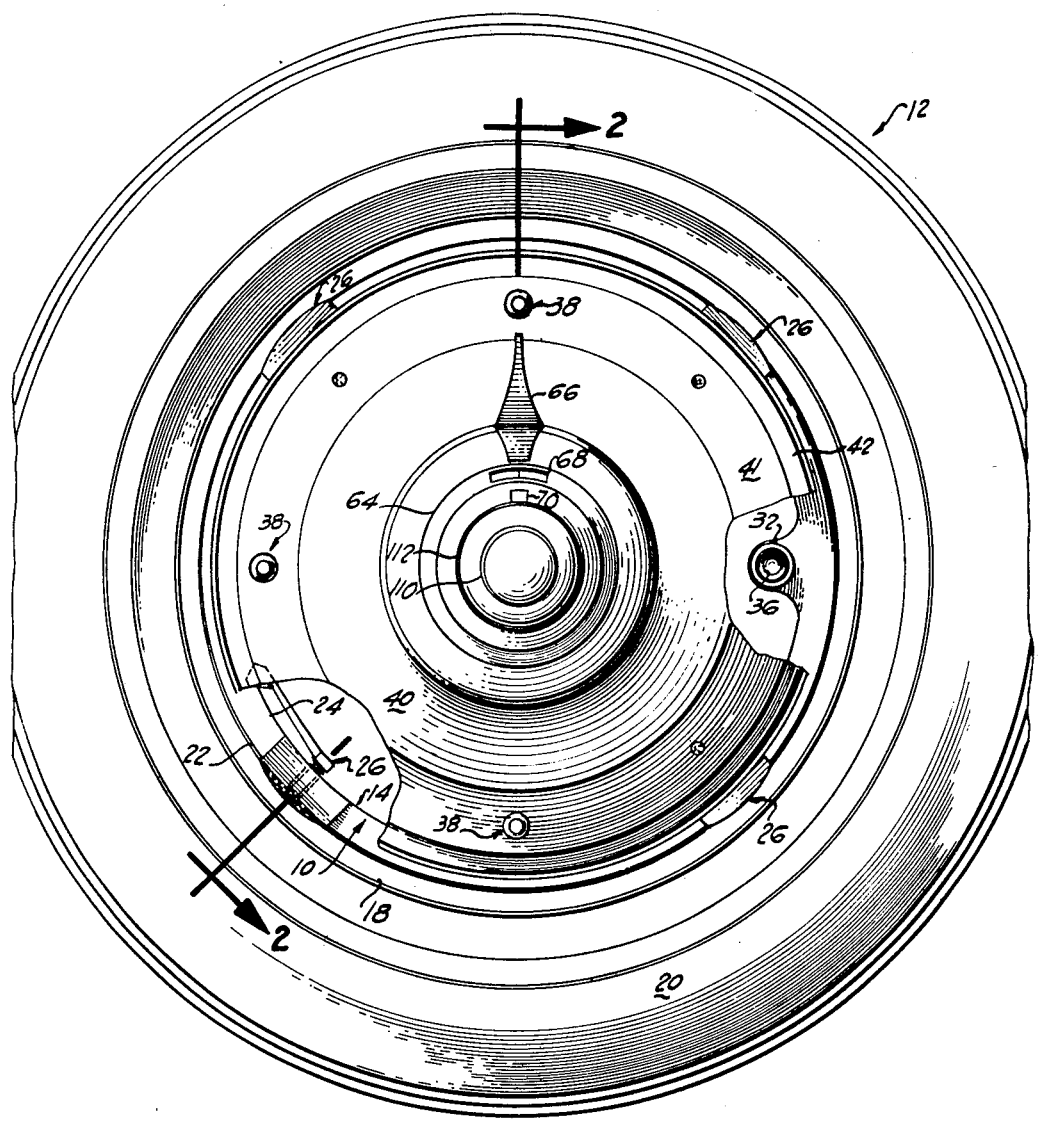
FIG. 1 is a front elevational view illustrating the balancer of the present invention mounted on a wheel.
Figure 2:
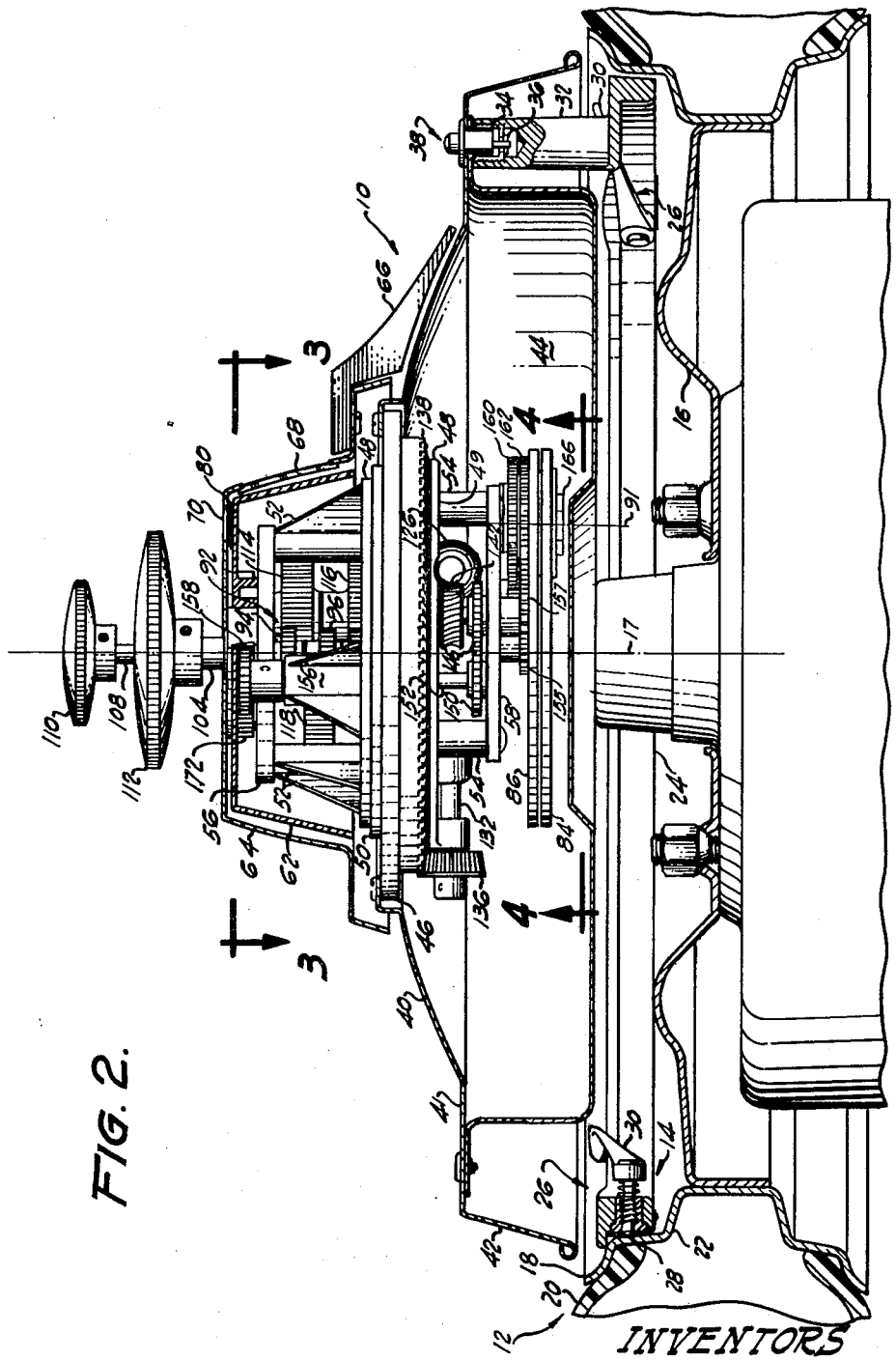
FIG. 2 is a sectional side elevational view of the balancer taken generally along the line 2—2 of FIG. 1.

In FIGS. 1 and 2 a mechanical wheel balancer assembly 10 is shown mounted on an automobile wheel assembly 12 by means of a mounting ring 14.

The automobile wheel assembly 12 comprises a wheel 16 supported on an automobile for rotation about its axis 17 and conventionally denominated as either a 13", 14" or 15" diameter wheel. The wheel 16 terminates in a bead rim 18 for engaging a tire 20, and a circumferential felly band portion 22 adjacent the rim 18 is engaged by the mounting ring 14.

The mounting ring 14 may be of the type described in Patent No. 2,929,598, issued to Pierce on Mar. 22, 1960, and comprises an annular frame 24 having a diameter somewhat less than the felly band portion of the wheel diameters noted above. The frame 24 is lockingly engaged with the wheel 16 by means of a plurality of spaced locking lever assemblies 26. Each lever assembly comprises a locking screw 28 threaded through the frame 24 and operated by a locking lever 30 to press a hardened steel point on the end of the screw 28 into the felly band portion 22 for clamping the ring to the wheel.

A plurality of spaced posts 32 project from the frame 24 outwardly of wheel 16 in a horizontal direction, and each has a central insert 34 in which a slot is formed. The slot receives a cross pin 36 of a spring biased bayonet type lock assembly 38, which is rotated in one direction to engage the lock assembly to the post and rotated to align the pin with the slot for disengaging the lock assembly. The bayonet lock assembly 38 is carried by the wheel balancer assembly 10 and locks the balancer assembly to the ring 14.

The balancer assembly 10 comprises a conical shaped housing having a central opening 39. An outer circular rim 41 on housing 40, in which the pushbutton assemblies 38 are seated, terminates in a peripheral end flange 42 overlapping the posts 32 to prevent accidental engagement of a foreign object with the posts. A second pan-like housing 44, spaced from housing 40 and having an end flange fastened to the circular rim 41, nests between the posts 32.

A support plate 46 is fastened to the margin of the central opening 39 in housing 40. The support plate 46 has a circular opening in which a bearing plate 48 is journalled with the bearing plate 48 being held against axial movement by a flange 49 at one end and a C-ring 50 at the other end as best seen in FIGS. 5 and 10. The bearing plate 48 has a plurality of posts 52 projecting from one surface thereof, and a plurality of posts 54 extending from the opposite surface. The posts 52 support a plate 56, and the posts 54 support a mounting plate 58, whose center of mass is substantially offset from the central horizontal axis of plates 48 and 56. The plates 48, 56 and 58 comprise a hub assembly which is rotatable about the axis 17.

The plate 56 rotatably carries a cup-shaped, plastic indicating drum 62 (FIG. 2), and fixedly carries a cup-shaped pointer housing 64 with the indicating drum 62 nested in the housing 64. The pointer housing 64 has a pointer 66 extending radially therefrom. The pointer is used for indicating the location of the unbalance relative wheel 16.

Pointer housing 64 is provided with a pair of windows 68 and 70. Seen through window 68 are a plurality of annular scales 72, 74 and 76 (FIGS. 7, 8 and 9) concentric to the axis 17 and carried by the flange portion of the indicating drum 62. The scales correspond to respective different diameters of wheel 16 and are printed on a scale strip 77. The drum 62 is actually formed as a truncated cone and the scales on strip 77, as seen in FIG. 9, are developed as respective arcs conforming to the respective diameters of the adjacent portions of the drum flange when strip 77 is secured thereto. For convenience in reading, the wheel 16, balancer 10 and the window 68 may be rotated from whatever position they are in to bring the window 68 to the top and place the relevant portion of the scales in a generally horizontal plane, as seen for example from FIG. 2. A hairline 78 across the window 68 and aligned with pointer 66 permits facile selection of the proper indication on one of the scales 72, 74 or 76. Additional spaced markings 80 and 82 corresponding to between 1½ and 2 ounces of unbalance are provided on the back of drum 62 as best seen in FIG. 8. Markings 80 and 82 are seen through window 70 at the back of housing 64 for the purpose of providing the operator with a quick indication of the most often used resultant weight for scanning the unbalance condition of wheel 16.

The scales 72, 74 and 76 provide an indication of the correction weight to be applied to respective diameter wheels in accordance with the ounce inches represented by a resultant weight necessary to balance the wheel 16. The resultant weight is controlled by the angular position of a pair of adjustable weights 84 and 86. The hub assembly including plates 48, 56, 58 and the weights 84 and 86 are rotatably adjusted relative the housing 40 and wheel 16. The weights 84, 86 are rotatably adjustable and the hub assembly relative to each other about an axis 91 which is parallel to but radially spaced from the axis of rotation 17 of the wheel.

Figure 11:
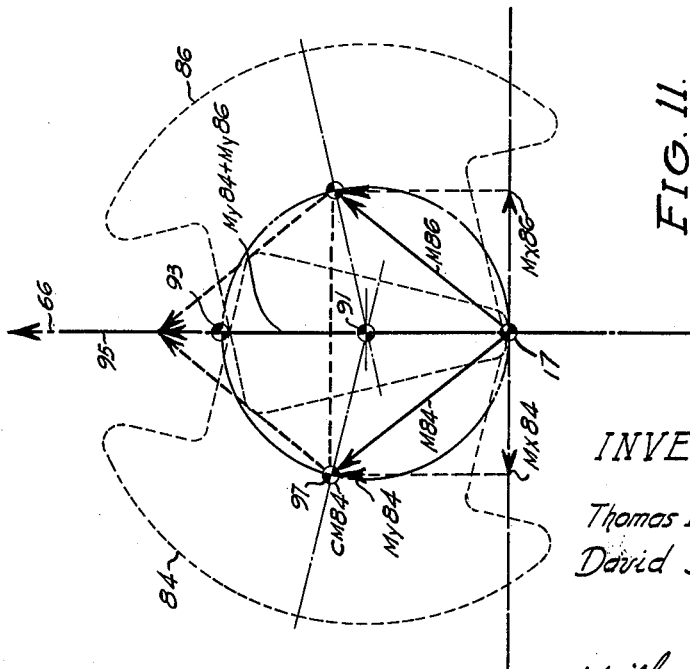
FIG. 11 is a schematic diagram of the balancer of FIGS. 1 through 10, showing balance force vectors.

Reference is now made to FIG. 11 which shows in a vectorial schematic diagram the operation of the balance forces. As previously mentioned, the balancer as well as the wheel rotates about the axis 17 while the weights 84 and 86 are rotatable with respect to each other and to the wheel about axis 91 which is parallel to but spaced from the wheel axis 17. The weights 84 and 86 are adapted and arranged to rotate with equal velocity in opposite directions with respect to each other through gearing means operable by manual controls to be hereinafter described.

The weights 84 and 86 are also constructed so that their respective centers of mass CM84, CM86 rotate about axis 91 along the circular path 93. There will be two positions along the circular path 93 at which the centers of mass (CM84, CM86) are aligned with one another, and the balancer is so constructed that one of these positions coincides with the axis 17 of wheel rotation. The other position is naturally 180° from this position and hence lies at point 93 along the diametric line 95 passing through the wheel axis 17 and axis of weight rotation 91.

When the two weights 84, 86 are positioned so that their respective centers of mass (CM84, CM86) are in line with the wheel axis of rotation 17, the whole balancer 10 is balanced with its center of mass located at the axis of rotation 17. Thus, when the wheel 12 is spun with the balancer assembly 10 attached and the weights 84, 86 in their aligned position with the axis of wheel rotation 17, no balance forces or moments are contributed by the balancer assembly 10.

On the other hand when the weights 84, 86 are in the position in which their centers of mass CM84, CM86 are aligned at point 93, the balancer assembly has a balance force or moment about the axis of wheel rotation 17 corresponding to the respective masses of the weights 84, 86 and the respective distances of the centers of mass from the axis of rotation 17. The position indicated 93 of course corresponds to the maximum balance force or moment which the balancer assembly 10 may contribute to the rotating wheel and balancer assembly.

As the weights 84, 86 are manipulated to rotate between their two aligned positions 17, 93, they provide intermediate balance forces between the zero condition at 17 and the maximum condition at 93. These balance forces always operate along the diametric line 95 as may be seen by the vectorial representations in FIG. 11.

For example, if the weights 84, 86 are positioned so that their respective centers of mass are at positions 97, 99, they will each cause balance forces acting along the vectors M84 and M86 about the axis of rotation 17. As viewed in FIG. 11, these balance forces or moments M84, M86 may be broken up into their respective X components MX84, MX86 and their respective Y components MY84, MY86. Since the X components MX84, MX86 are equal and operate in opposite directions to the center of rotation 17, they cancel out and result in no moment about the wheel axis 17. On the other hand the Y components MY84, MY86 both act on the same side of axis 17 and hence are additive to provide a resultant moment represented by the resultant vector MY84 plus MY86. As long as the moments M84, M86 which represent the product of the respective centers of mass CM84, CM86 and their respective distances from the axis of rotation 17, the resultant of their Y components MY84 plus MY86 will operate along the diametric line 95. Hence, the pointer 66 on the housing 64 is aligned with the diametric line 95 through which the resultant moments act to point to a position on the wheel where the weight of an amount corresponding to the positions of weight arms 84, 86 is to be positioned.

Figure 12:
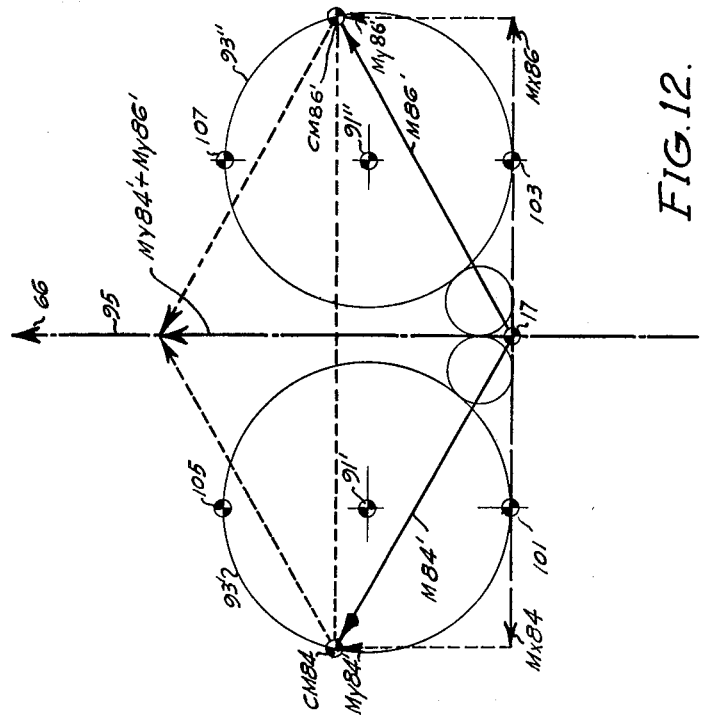
FIG. 12 is a schematic diagram of a second embodiment balancer showing balance force vectors related thereto.

FIG. 12 shows in schematic form a second embodiment of a balancer using the invention in which the centers of mass CM84′, CM86′ of weights 84′, 86′ (not shown) rotate in separate circular paths 93′, 93″ about their own respective axes 91′, 91″. As long as the weights are constructed and arranged so that their respective centers of mass CM84′, CM86′ produce equal balance forces or moments MY84′, MY86′ about the axis of wheel rotation 17, the resultant balance force will pass along the line 95 from a zero position when the centers of mass CM84', CM86' are positioned at points 101, 103 to a maximum position whereat the centers of mass lie at points 105, 107. Again the X components of the moments cancel out and the Y components MY84', MY86' are additive to produce the resultant MY84' plus MY86' along the line 95. It can be seen that if the minimum points 101, 103 define a line passing through the wheel axis 17, the balancer will have no moments about the axis 17 as it rotates with the wheel with the weights in this position.

It will also be understood that the weights 84, 86 need not necessarily be equal as long as the loci of the moments produced by their respective centers of mass about the axis of wheel rotation 17 follow identical mirror image paths with respect to a diametric line.

A cone clutch assembly 92 provides the operator controllable means for driving the weights 84, 86, and comprises a set of four axially-spaced gears 94, 96, 98 and 100 (FIGS. 5 and 10) between plates 48 and 56. Gears 94 and 96 are engaged alternately by a cone clutch 102 in response to axial movement in a respective direction of a shaft 104 journalled in plate 56. Gears 98 and 100 are engaged alternately by a cone clutch 106 in response to axial movement in a respective direction of a shaft 108 journalled in shaft 104. Both shafts 104 and 108 extend through the pointer housing 64 with shaft 108 extending beyond shaft 104. Knurled handles or knobs 110 and 112 are provided for ease in manipulating the shafts 108 and 104, respectively, as seen in FIG. 2.

Gears 94 and 98 engage with respective axially-spaced gears 114 and 116 located on a shaft 117 journalled in plates 48 and 56. Gear 114 is journalled on shaft 117 and operates only to rotate an adjacent gear 118 in response to the operation of gear 94 by clutch 102. Gear 116 is pinned to shaft 117 and rotates the shaft 117 is one direction responsive to the operation of gear 98 by its cone clutch 106.

Gears 96 and 100 engage with respective axially-spaced gears 118 and 120 carried on another shaft 121 journalled in plates 48 and 56. Gear 118 is pinned to shaft 121 to rotate the shaft in one direction in response to the operation of gear 96 by cone clutch 102 and in the opposite direction in response to rotation by gear 114. Gear 120 is journalled on shaft 121 and only rotates gear 116 and shaft 117 in a direction opposite to the direction in which gear 116 is rotated by gear 98.

The shafts 117 and 121 rotated by gears 116 and 118 respectively protrude through plate 48 and carry respective worm gears 122 and 124 on the protruding end. Worm gears 122 and 124 engage respective worm wheels 126 and 128 carried on respective shafts 130 and 132.

Shaft 132 carries a bevelled pinion gear 136 for engagement with a bevelled ring gear 138 formed on the adjacent surface of support plate 46 which is attached to housing 40. When housing 40 is rotating with wheel 16, the angular position of the plates 48, 56 and 58, and the indicating drum 62 carried by plate 56 are adjusted about the central axis of housing 40 and wheel 16 by axial movement of shaft 104 to engage either gears 94 or 96 and cause gears 118, 124, 128 and 134 to rotate in respective directions for moving the plates and drum in a desired direction.

The shaft 130 carries a worm gear 140 for engagement with a worm wheel 142. Wheel 142 is carried on a shaft 144 journalled in plates 48 and 58. The shaft 144 carries a pair of gears 146 and 148 spaced on opposite sides of mounting plate 58. The tandem connection of worm gears and wheels 122, 126, 140 and 142 of course provides a considerable gear reduction in the available space.

Gear 146 engages an adjacent gear 150 carried on an elongate shaft 152 to drive gear 150 and shaft 152 in the opposite direction from gears 146 and 148. One end of shaft 152 is journalled in plate 58. The other end of shaft 152 extends through a post 156 on plate 48 and carries a gear 158 nested in a circular recess of drum 62.

The gear 148 engages idler gear 154 which in turn engages a large diameter gear 160. In addition, gear 148 drives the large gear 162 through the two equal sized gears 155, 157. Gear 162 is fixed to weight 86 for rotating same and is journalled on a hub 164 which connects gear 160 to weight arm 84. Hub 164 in turn is journalled on a spindle 167 projecting from plate 58, and a thrust nut and washer 166 holds the gears and weight arms in position. Gears 160 and 162 rotate in opposite directions due to the action of gears 148, 154, 155 and 157 to in turn move the weights 84 and 86 towards or away from each other dependent on the direction in which the gears are rotated by wheel 140.

Gear 158 on the end of shaft 152 opposite gear 154 engages a ring gear 172 integrally formed on the wall of the recess in indicator drum 62 so that the drum rotates with gear 150. The gears 158, 172 have the same gear ratio as gears 148, 162 so that the drum will indicate the resultant weight produced by changes in the angular positions of weights 84 and 86 relative the plate 58.

The three circumferential scales 72, 74 and 76 on drum 62 are calibrated for indicating respective correction weights corresponding to an unbalance condition in ounces for wheels of respective 13", 14", and 15" diameter. The 13" diameter scale can also be used for 12" diameter wheels with minor allowance and the 15" scale can also be used for 16" wheels with allowance for the increased diameter.

The scales seen through window 68 have respective graduations and characters offset from each other in accordance with each correction weight corresponding to the resultant weight produced when weights 84 and 86 are set in any particular angular position. The ratio of the spacing between increments on the scales varies in accordance with the wheel diameter ratios so that spacings on the 13" diameter scale 72 are $13/14$ those of the 14" diameter scale 74, which in turn are $14/15$ of the 15" diameter scale 76.

The background of the scales is marked with one color in area 174 extending for about ½ ounce on opposite sides of the zero mark for providing a quick indication to the operator of the near-balanced or balanced condition. A differently colored area occupies the remainder of the background indicated at area 176 to provide a quick indication of a large unbalance condition.

To balance the wheel 16, it is conventionally raised from the supporting surface. The mounting ring 14 is attached to the wheel 16 usually before the wheel is raised. The assembly 10 is attached to the posts 32 by operation of the pushbutton assemblies 38. Both the ring 14 and balancer assembly 10 are given a substantial axial tug to ensure that they are securely locked into position. The wheel 16 is rotated rapidly, after it is raised, either with a wheel spinner or through the vehicle drive to rotate assembly 10 therewith.

Since the unbalance condition of most wheels does not exceed 3 to 4 ounces, the operator will likely choose to scan the wheel with a resultant weight of 1½ to 2 ounces. He grabs the knob 110 and pulls or pushes it along with shaft 108 to cause cone clutch 106 to engage with either gears 98 or 100. This actually holds the engaged gear 98 or 100 stationary with respect to the spinning balancer and causes the associated gear 116 or 120 to also rotate relative to the rotating balancer 10. Gear 116 and shaft 117 are therefore rotated in a respective direction depending on whether gear 98 or 100 is engaged with clutch 106, for rotating gear train 122, 126, 140, 142, 146, 148, 154, 155, 157, 160 and 162 in respective directions.

Gears 160 and 162, of course, rotate in opposite directions dependent on the direction of rotation of gear 116 under control of either gear 96 or 100 to rotate weights 84 and 86 either towards or away from each other until the operator, by simply observing the window 70, notes that one of the red flags or indicators 78 appears stationary in the window 70. Weights 84 and 86 are then positioned so as to correspond to a 1½ to 2 ounces resultant weight, which is used for scanning the wheel to locate the position of the unbalance weight.

The operator now releases knob 110 and conveniently reaches thereover to grasp knob 112 and pull or push shaft 104 to engage one clutch 102 with either gear 94 or 96. This holds one of the gears 94 or 96 stationary to rotate the associated gear 114 or 118. Gear 118 rotates in a direction dependent on whether gear 94 or 96 is engaged. Gear 118 in turn drives the gears 124, 128 and 136 relative the ring gear 138 on plate 46, the balancer housing 40 and the wheel 16. The plate 58 together with weights 84 and 86 therefore move as a unit relative the axis of the balancer until the operator detects a minimum vibration. It will be noted that the resultant weight of 1½ to 2 ounces defined by the position of weights 88 and 90 relative to each other has been used for scanning the wheel 16. The location of the unbalanced position relative the wheel 16 at the position of minimum vibration is given by the pointer 66.

As the correct unbalance weight may not yet be accurately determined, the operator again manipulates knob 110 and shaft 108. He now manipulates shaft 108 to either increase or decrease the resultant weight defined by the angular spacing between weights 88 and 90 until he senses a further reduction in vibration. This informs him that the resultant weight corresponds to the actual unbalanced weight of the wheel. Of course, if the operator believes the sensed vibration is still too high, he may again manipulate shaft 104 to define more accurately the location of the unbalance and follow this procedure with further refinment of the resultant weight. It will be noted that the direction in which the operator usually chooses to move the hub assembly or the weights 84 and 86 is dependent on the direction in which he thinks he will most easily achieve a balance condition. The choice of the initial scanning weight is, of course, variable and depends on what weight the operator believes most closely corresponds to the unbalance condition of the wheel.

The operator, after he has detected the lowest level of vibration, stops the wheel 16. To accurately read the correction weight in ounces on the appropriate one of the scales 72, 74 or 76, he may manually rotate the wheel until the pointer 66 is located along the vertical axis of the wheel and is pointing upwardly. This places the window 68, the hairline 78 and the appropriate portion of the scales 72, 74 and 76 in a generally horizontal plane where they may be more easily read and without the necessity of the operator maintaining his eye level at the level of the scales. After reading the correction weight and noting the position of the pointer, he thereafter adds a corresponding weight to the wheel 16 in the appropriate position.

While the foregoing has described preferred modes of carrying out this invention, the attached claims define the invention to be protected.

What is claimed is:

1. In a device for balancing an object rotatable about its intended center of mass, said device having a base fixedly attachable to said object for rotation therewith about the axis of said object, a hub mounted on the base rotatable with respect thereto about said axis, means controllable by an operator for effecting rotation of said hub, and means for counter-balancing the unbalance in the object, an improvement of said device wherein said counter-balancing means comprises a pair of substantially identical weights, means journalling said weights on said hub for continuous rotation of the centers of mass of said weights with respect to said hub about an axis radially spaced but parallel to the axis of said object, and means for causing simultaneous but opposite rotation of said weights in either direction, the axis of rotation of said weights being positioned with respect to each other and said hub so that their centers of mass coincide with each other on the axis of said object to define a zero balance force position and coincide with each other at a point radially spaced from the axis of said object to define a maximum balance force position.

2. The device of claim 1 comprising means in cooperative relationship with at least one of said weights for indicating the amount of unbalance of said object.

3. The device of claim 1 comprising a pointer on said hub in diametric alignment with the line between said zero and maximum positions for indicating the locus of unbalance of said object.

4. In a device for balancing an object rotatable about its center of mass, said device having a base fixedly attachable to the object for rotation therewith about the axis of the object, a hub mounted on the base rotatable with respect thereto about said axis, means controllable by an operator for effecting rotation of said hub, and means for counter-balancing the unbalance in the object, an improvement of said device wherein said counter-balancing means comprises a pair of weights, means journalling each of said weights on said hub for continuous rotation of the centers of mass of said weights with respect to said hub about an axis radially spaced but parallel to the axis of said object, and means for causing simultaneous but opposite rotation of said weights in either direction, said journalling means positioning said weights with respect to each other and said hub so that the resultant of their vectorially added moments about the axis of said object ranges from zero to maximum in a linear direction outwardly from said object axis along a radial line.

5. The device of claim 4 comprising means in cooperative relationship with at least one of said weights for indicating the amount of unbalance of said object.

6. The device of claim 4 comprising a pointer on said hub in diametric alignment with the line between said zero and maximum positions for indicating the locus of unbalance of said object.

7. In a device for balancing an object having a base fixedly attachable to the object for rotation therewith about the axis of the object, a hub mounted on the base rotatable with respect thereto about said axis, means controllable by an operator for effecting rotation of said hub, and means for counter-balancing the unbalancing in the object, an improvement of said device wherein said counter-balancing means comprises a first weight, means mounting said first weight on said hub for rotation of its center of mass in a circular path intersecting said axis, a second weight, means mounting said second weight on said hub for rotation of its center of mass in a circular path intersecting said axis and means for simultaneously driving said weights to rotate in opposite directions with respect to said hub from a zero balancing force position whereat the centers of mass of both of said weights lie on said axis.

8. In a device for balancing an object rotatable about an axis having means for counter-balancing the unbalance in the object and means for fixing said counter-balancing means to said object, an improvement in said device wherein said counter-balancing means comprises a pair of weights, means mounting said weights for rotation of the centers of mass of said weights with respect to said object, the axis of rotation of each of said weights being parallel to and displaced from the axis of said object, and means for causing simultaneous but opposite rotation of said weights in either direction while said object is spinning, said mounting means positioning said weights with respect to each other and said object so that the resultant of their vectorially added moments about said object axis ranges from zero to maximum along a line perpendicular to said wheel axis.

9. A device for balancing wheels comprising a base fixedly attachable to said wheel for rotation therewith about the axis of rotation of the wheel, a hub mounted on said base and rotatable with respect thereto about said axis, means controllable by an operator for effecting rotation of said hub, a pair of weights, means journalling said weights on said hub for continuous rotation of the centers of mass of said weights with respect to said hub about an axis parallel to and radially displaced from said wheel axis, operator manipulatable means for causing simultaneous but opposite rotation of said weights in either direction while said wheel is spinning, said journalling means positioning said weights with respect to each other and said hub to create a minimum balancing force when the centers of mass of said weights are in a position aligned with said wheel axis, a maximum balancing force when the centers of mass of said weights are aligned with each other at a position radially spaced from said wheel axis and intermediate balancing forces when the centers of mass of said weights are equispaced from said wheel axis and from a line between the maximum and minimum positions.

10. A device for balancing wheels comprising a base fixedly attachable to said wheel for rotation therewith about the axis of rotation of the wheel, a hub mounted on said base and rotatable with respect thereto about said axis, means controllable by an operator for effecting rotation of said hub, a pair of weights, means journalling said weights on said hub for continuous rotation of the centers of mass of said weights with respect to said hub, the axis of rotation of each of said weights being parallel to and displaced from said wheel axis, and means manipulatable by an operator for causing simultaneous but opposite rotation of said weights in either direction while said wheel is spinning, said journalling means positioning said weights with respect to each other and said hub so that the resultant of their vectorially added moments about said wheel axis ranges from zero to maximum in an outwardly direction from said wheel axis along a radial line.

References Cited

UNITED STATES PATENTS

| | | | |
|---|---|---|---|
| 79,475 | 6/1868 | Jones | 51—169 |
| 1,730,019 | 10/1929 | Trumpler. | |
| 2,459,947 | 1/1949 | Leflar | 74—573 |
| 2,675,200 | 4/1954 | Wohlforth | 73—458 XR |
| 2,780,939 | 2/1957 | Kellogg | 73—458 |

JAMES J. GILL, Primary Examiner